Oct. 23, 1923.  1,471,358

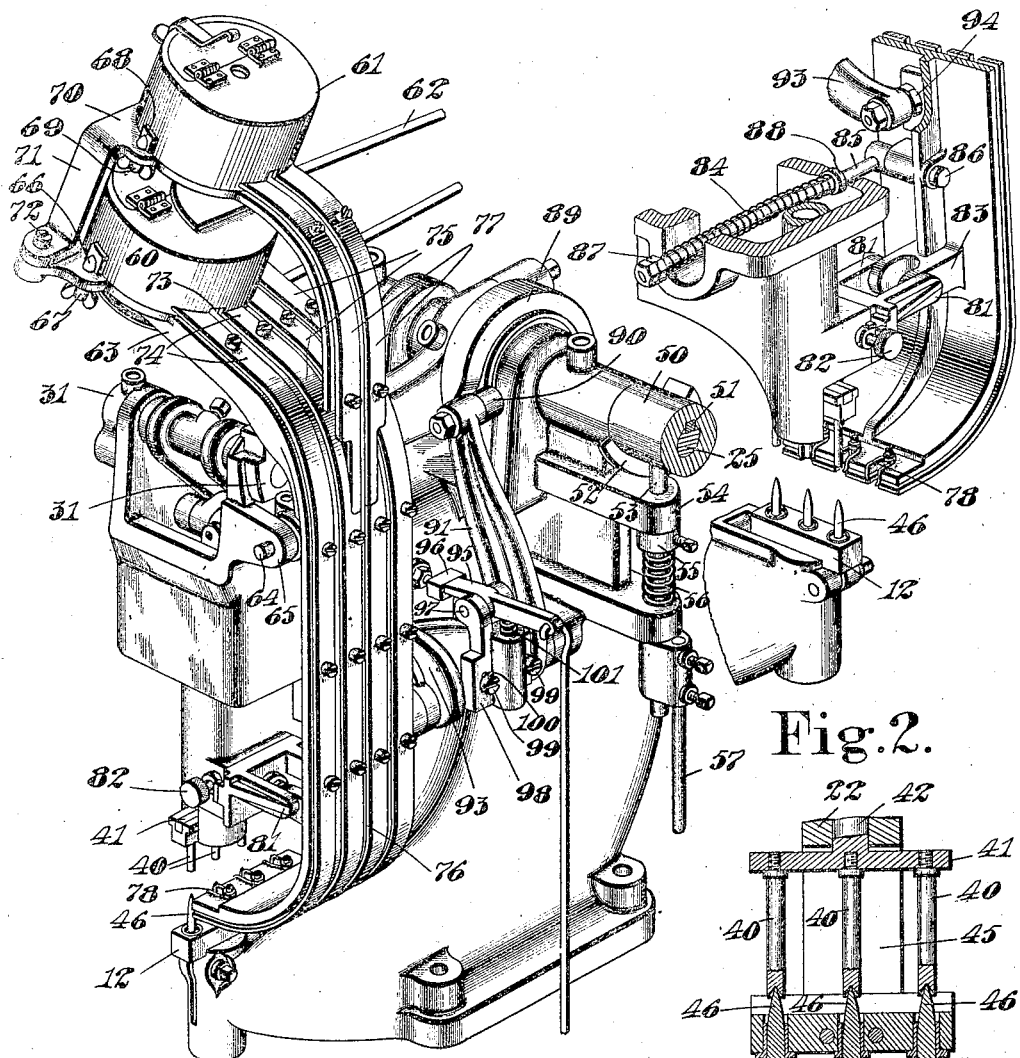

F. A. RUMNEY
FASTENER INSERTING MACHINE
Filed Sept. 27, 1919   2 Sheets-Sheet 2

INVENTOR
Fred A. Rumney.

Patented Oct. 23, 1923.

1,471,358

UNITED STATES PATENT OFFICE.

FRED A. RUMNEY, OF CAMBRIDGE, MASSACHUSETTS, ASSIGNOR TO UNITED SHOE MACHINERY CORPORATION, OF PATERSON, NEW JERSEY, A CORPORATION OF NEW JERSEY.

FASTENER-INSERTING MACHINE.

Application filed September 27, 1919. Serial No. 326,771.

*To all whom it may concern:*

Be it known that I, FRED A. RUMNEY, a citizen of the United States, residing at Cambridge, in the county of Middlesex and State of Massachusetts, have invented certain Improvements in Fastener-Inserting Machines, of which the following description, in connection with the accompanying drawings, is a specification, like reference characters on the drawings indicating like parts in the several figures.

This invention relates to fastener-inserting machines of the type in which fasteners are supplied to the setting mechanism by automatic or semi-automatic means. For purposes of illustration the invention is shown as embodied in a machine for setting a simple fastener and a plurality of compound fasteners simultaneously in an article of manufacture, although it will be apparent that it would be within the scope of the invention to change the tool equipment for setting simple fasteners only, or compound fasteners only, or for setting a different assortment of simple and compound fasteners, according to the requirements of the work to be done. Similarly the invention in various aspects is not limited to use in connection with fasteners of the type shown.

One object of the invention is to provide a fastener-inserting machine having improved punching-and-inserting mechanism and fastener-supplying mechanism capable of independent control when desired so that, for example, the work may be punched during a preliminary cycle of the former mechanism without receiving a fastener from the supplying mechanism and without relinquishing its hold on the work, the two said mechanisms being capable of operating conjointly during a subsequent cycle of the punching-and-inserting mechanism to insert a fastener into the hole punched during the preliminary or punching cycle.

Accordingly features of the invention consist in a machine organization in which the punching-and-inserting mechanism and the fastener-supplying mechanism may be controlled independently of each other so that the former may be caused to execute a preliminary cycle of motions to punch the work without inserting a fastener, and in which the two mechanisms may be thereafter brought into operation conjointly to set a fastener in the hole punched during the preliminary cycle.

This feature is especially advantageous when operating on relatively thick materials since it enables the setting mechanism to prepare the holes for the fasteners without subjecting the latter to the likelihood of being crushed. It is also advantageous when the work requires washers or other plates between the sheet-material and the flanges of the gromets, since it enables the washers or plates to be assembled with the punched work prior to the beginning of the gromet-inserting cycle.

The problem of conducting groups of fasteners from separate sources of supply to closely related inserting tools entails various difficulties. For example, according to the usual construction the raceways would be separate and distinct from each other if not entirely independent structures. This would in every case require a great multiplicity of parts since the number of parts necessary for one raceway would have to be duplicated for each additional raceway. Furthermore, if the delivery ends of the raceways are required to be arranged side by side in close relation to each other it would be impossible to utilize the usual raceway construction without resorting to the comparatively difficult and costly work of providing lateral curvatures leading to the delivery ends. Accordingly an object of the invention is to provide a multiple raceway structure adapted to conduct groups of fasteners from separate sources of supply to closely related inserting tools without requiring lateral curvatures in the raceways and without duplication of all the parts for each raceway.

In this aspect and in accordance with a feature of the invention the illustrated machine has an improved arrangement of slot-forming strips two of which form a complete raceway slot extending from one source of supply to one tool, while a third strip is arranged to form, conjointly with one of the first two, a second raceway slot for conducting to another tool fasteners supplied from another source. The third strip may, conveniently, lead out of either of the two sources of supply, according to the assortment of fasteners desired, but however that may be, the combination preferably includes means for conducting fasteners from the second source to the second raceway slot mentioned above. There may be as many more raceways as desired. In fact, the example shown includes three raceways formed by four slot-forming strips. Furthermore, according to the arrangement shown, all four of the strips lead out of one hopper, but the upper end of the middle slot is not used. Instead, fasteners from another hopper are conducted into the middle slot between its ends by a short raceway section the lower end of which is mortised into the two strips that form the middle slot. Various arrangements of raceway strips and hoppers embodying this feature would be within the scope of the invention.

The foregoing features and others are illustrated by the accompanying drawings and are hereinafter described and claimed.

Referring to the drawings—

Fig. 1 represents a perspective view of a fastener-setting machine embodying the invention in a form designed to set, simultaneously, two fasteners taken from one source of supply and one fastener taken from another source of supply. This figure includes a portion only of the clutch by which the mechanisms are operated.

Fig. 2 represents a perspective view, partly in section, including the setting tools and the delivery portion of a multiple raceway for supplying fasteners thereto.

Fig. 3 represents a vertical section through the setting tools showing the latter as having punched the work preparatory to inserting the fasteners.

Fig. 4 represents a view similar to Fig. 3 excepting that the setting tools are in the act of setting the fasteners.

Fig. 10 is a perspective sectional view of a fragment of a belt having metallic strips secured in pairs to opposite sides by gromets each extending through both strips of a pair.

Figures 5, 6, 7, 8, 9:
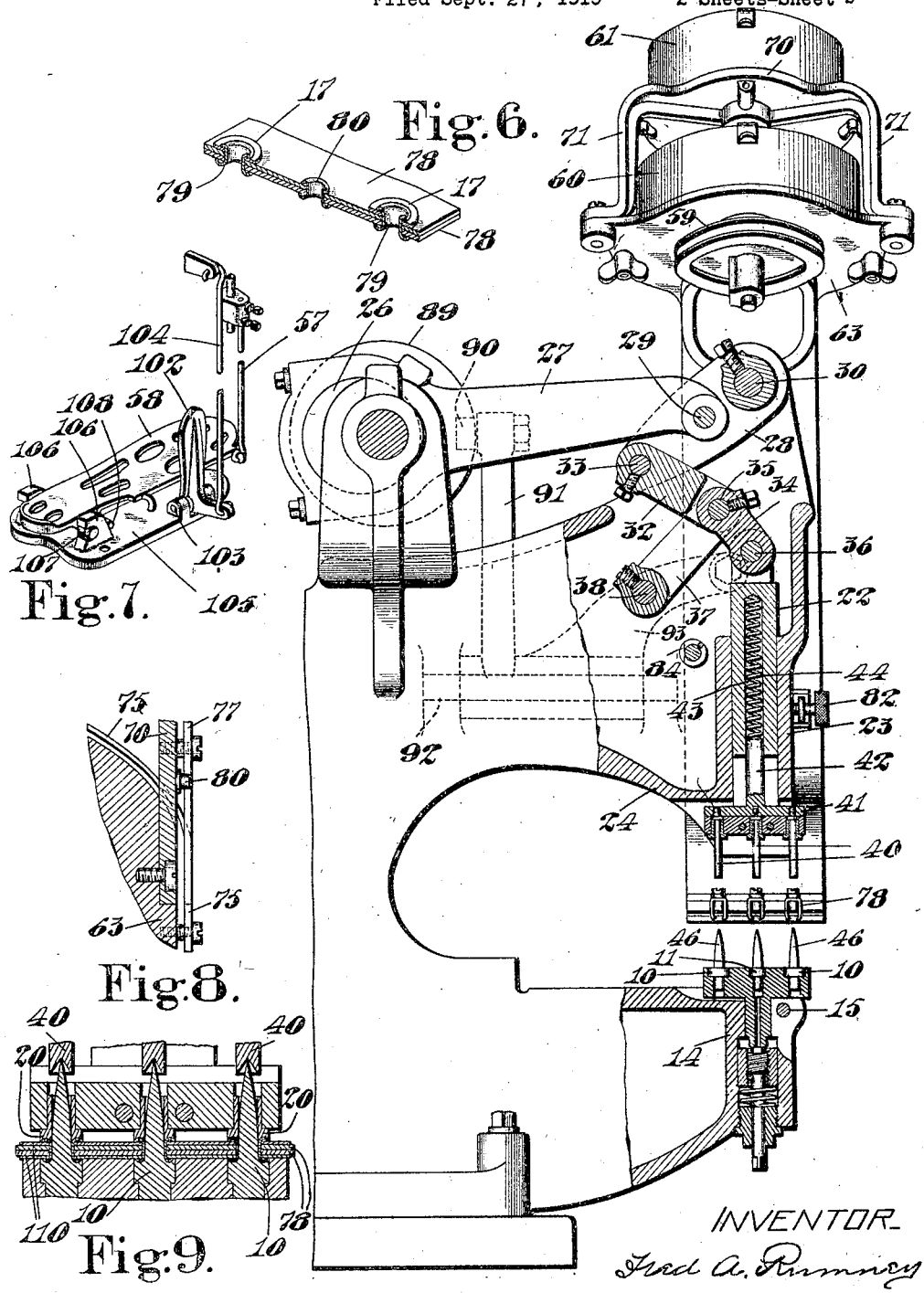
Fig. 5 represents a side elevation partly in section of the machine.
Fig. 6 represents a perspective sectional view of a fragment of work.
Fig. 7 is a perspective view of two foot-levers for tripping the clutch and raceway respectively.
Fig. 8 is a vertical section of the mortised joint between two raceway sections.
Fig. 9 is a sectional view similar to Fig. 4 excepting that the setting tools are formed to operate on work such as that shown by Fig. 10.

The specific character of the following description is merely for facilitating an understanding of the construction shown by the drawings and is not to be understood as imposing any undue limitation on the invention or on the claims directed thereto.

According to the construction shown by Figs. 1 to 5, the fastener-setting mechanism comprises three lower setting tools 10, 10, and 11, the latter being interposed between the tools 10. These three tools, as shown, are embedded in a block or holder 12, the latter having a shank 13 by which it is clamped in a split boss 14 formed on the main frame of the machine. A clamping bolt 15 is arranged to contract the split portion of the boss so as to clamp the shank.

In the present instance the two tools 10 are counterbored to provide annular flanges 16 to receive and engage the rims of washers 17, so that the latter may be seated upon supporting surfaces 18 and be centered relatively to the upsetting surfaces 19.

The upper setting tools 20, 20, 20 are carried by a plunger 22 arranged to slide up and down in a bearing 23 formed in an overhanging part 24 of the frame. This plunger is moved up and down by mechanism shown in Fig. 5. The main shaft of the machine is indicated at 25. It carries an eccentric 26 upon which an eccentric-rod 27 is mounted. The forward end of this rod is connected to a toggle member 28 by a pivot pin 29. The toggle member is hung on an anchor pivot 30 the ends of which are journaled in bearings 31 in the frame. Toggle member 28 is connected to a companion toggle member 32 by pivot pin 33. The lower end of member 32 is connected to one end of a link 34 by a pivot pin 35 and the other end of this link is connected to the upper end of plunger 22 by a pivot pin 36. The ends of pivot 35 are mounted respectively in arms 37 of a yoke which is mounted to oscillate on a pivot member 38.

In the present instance the upper setting tools are utilized to insert the fasteners into the work, and for this reason they are bored centrally to receive spindles 40, 40, 40. The upper ends of the spindles are screwed into a head 41 formed on the lower end of a shank 42; said shank being arranged to extend into a socket 43 formed in the setting plunger. A compression spring 44 is arranged in the socket to bear downwardly on the shank 42 so as to project the spindles normally through the tools 20. The construction and operation of the tools is such that when the setting plunger is fully depressed the spindles 40 are withdrawn from the tools 20, and accordingly, in order to maintain registration of the spindles with the tools so that the former may enter the latter as the plunger rises, the plunger and the head 41 are formed to prevent turning motion of one relatively to the other while permitting relative longitudinal movement. As shown, the plunger 22 is divided at its lower end to provide a space for the reception of the head 41 and to provide flat, parallel, confronting faces 45 arranged to maintain engagement with opposite sides of the head or to permit the head to slide up and down relatively thereto.

Inasmuch as the illustrated machine is intended to be used for operating on woven fabric it is provided with the form of punching means that is preferred for such work, viz., pointed tools 46, 46, 46 adapted to spread the meshes of the woven material without severing them or otherwise causing injury that would deprive the fasteners of adequate anchorage or that would result in raveling of the materials. These tools 46, commonly termed "spear points," are formed upon the setting tools 10, and they function conjointly with the upper setting tools to punch the work. Consistently with the formation of the punching tools, the ends of the spindles 40 are provided with concentric cavities adapted to receive the spear points, the cavities being preferably conical so as to assist in maintaining co-axial registration between the spindles and the upper setting tools when the spindles are withdrawn from the tools, as shown in Figs. 2 and 4. Since the spear points take the place temporarily of the spindles and fit closely in the upper setting tools, they assist in guiding the lower ends of the spindles into the upper tools as the upsetting plunger rises.

Any suitable mechanism may be provided for rotating shaft 25, but in the present instance the latter is provided with a disconnectible clutch. Fig. 1 includes a portion of the driven element 50 of such clutch, this element being connected to the shaft by a spline 51 so as to transmit rotation to the shaft and so as to be movable endwise relatively to the shaft. The member 50 is provided with a mutilated cam portion 52 by which the connecting and disconnecting of the clutch is controlled. A plunger rod 53 is arranged to slide up and down in bearings 54 in the frame and is provided with a collar 55 against which a compression spring 56 bears to maintain the upper end of the plunger normally in the path of the cam 52. A rod 57 forms connection between this plunger and a treadle 58 (see Fig. 7). When the parts are in the position shown by Fig. 1, the clutch is maintained in disconnected position by plunger 53 but when the latter is depressed far enough to release cam 52, the clutch member 50 may move to the right under the influence of a clutch spring (not shown) to complete the driving connection. When the clutch treadle is released, the spring 56 restores the upper end of the plunger to the path of cam 52 and as the latter continues to rotate it co-acts with the plunger to shift the clutch member 50 to the left.

The mechanism for supplying fasteners to the setting mechanism will, of course, be subject to some variations according to the character of the work to be done and according to the assortment of fasteners required, and although the drawings show only two different examples of work and appropriate tool equipment for these two examples, it is to be understood that other combinations of fastener-supplying elements would be within the scope of the invention.

Referring to the construction shown by Figs. 1 to 5, the fasteners are supplied by two hoppers 60 and 61. These hoppers are arranged in co-axial relation to each other so that their feeders (not shown) may be driven by a single belt 62. The belt runs on a pulley 59 secured to the feeder-shaft of the hopper 60, and may be driven by a pulley on shaft 25. The hoppers are supported by an oscillatory raceway unit comprising a plurality of raceway slots. The main base-plate of the raceway structure is indicated at 63 and is mounted on a pivot pin 64 which in turn is mounted in supporting ears such as that indicated at 65. The hopper 60 is mounted directly upon the upper part of the base-plate 63 and is detachably secured thereto by bolts 66 and wing-nuts 67. Hopper 61 is likewise detachably secured by bolts 68 and wing-nuts 69 to a base plate 70 which forms a part of another raceway. Base-plate 70 is formed with supporting legs 71 which straddle hopper 60 and are detachably fastened to base-plate 63 by screws 72. The fasteners supplied by hopper 60 have egress from the latter through two ports, one of which is indicated at 73. The space between these ports is the same as that between the two outer spindles 40, and the fasteners are guided to the latter in separate courses by two pairs of slot-forming strips 74, 74 and 75, 75.

The two middle strips 74 and 75 are arranged to form, between them, a third raceway slot 76, and although both strips by which this slot is formed lead from hopper 60, the slot 76 does not receive fasteners from that hopper. This slot is used to conduct fasteners supplied from hopper 61 and for this purpose a relatively short raceway section formed by base-plate 70 and slot-forming strips 77 is mortised into the middle strips 74, 75 between the ends of the latter. The lower ends of the raceway members leading from the upper hopper are reduced in width, and the strips 74, 75 into which they are mortised are cut out to receive them as shown by Fig. 8, the lower part of the plate 63 being in effect a continuation of the plate 70, while the confronting margins of strips 74, 75 form continuations of strips 77. It is to be observed that there is no lateral curvature in any one of the raceway slots although the slot-forming strips are curved in the direction of their thickness.

In accordance with usual practice the delivery ends of the raceways are provided with yielding detents 78 to prevent the fasteners from leaving the raceways until they are forcedly removed by the spindles 40.

Since hopper 60 may supply two courses of fasteners of one kind or size while hopper 61 may supply another course of fasteners of another kind or size, the fasteners thus supplied by both hoppers may be presented to the inserting tools in groups each of which includes two fasteners of one kind or size and one fastener of another kind or size. Figure 6 illustrates a sample of work that may be done by the machine when the fasteners are assorted as aforesaid. This figure shows a fragment of the work inverted relatively to its position when the fasteners are inserted and clenched. This sample of work includes two layers 78 of sheet material such as canvas. The gromets 79 that are inserted through the washers 17 have barrels slightly longer than that of the intermediate eyelet or gromet 80. They may, of course, differ in other respects from the fastener 80, as for example, in regard to their diameter or the thickness of the metal of which they are made.

As the raceway structure swings about its pivot pin 64 the delivery ends are maintained in the desired paths by a stationary guide comprising fingers 81. This guide is connected to the frame in such manner as to be capable of sliding in lines parallel to the axis of the pivot pin 64 and is provided with an adjusting screw 82. The fingers straddle a lug 83 formed on the raceway structure. The delivery ends are moved into registration with the spindles 40 by a compression spring 84 (Fig. 2). This spring surrounds a rod 85 one end of which is provided with a head having a pivot pin 86. This pin is arranged in a bearing in the raceway structure. The spring is compressed between a nut 87 on the other end of the rod and a collar 88 which is free to slide relatively to the rod and is arranged to abut against a portion of the frame. The delivery ends are retracted from delivering position by a cam 89 carried by the shaft 25. This cam works on a roll 90 carried by an arm 91. The arm is journaled on a fulcrum member 92 which is mounted in portions of the frame. An arm 93 rigidly related to arm 91 is provided with an adjustable stud 94 arranged to bear against the raceway, as shown by Fig. 2, so that when the arm 91 is actuated by the cam, arm 93 retracts the raceway against the stress of spring 84. The retractory movement of arm 91 as produced by the cam is sufficient to place the arm under the control of a restraining device whereby the delivery ends of the raceways are maintained in retracted position. This restraining device, according to the illustrated construction, comprises a latch 95 and a stationary abutment 96. The abutment is carried by the outer end of an adjustable screw which is screwed into the frame in line with the latch as shown by Fig. 1. The latch is pivotally mounted by a pin 97 in a bracket 98, and the latter is affixed to the arms 91, 93 by screws 99. These screws extend through holes 100 formed in the bracket, the holes being elongated vertically so that the bracket may be adjusted up and down. A compression spring 101 carried by the bracket presses upwardly against one arm of the latch to keep the latter normally in latched position relatively to abutment 96 as shown by the drawing. Any preferred means may be provided for tripping the latch to release the raceway structure, the actuating means shown by Figure 7 comprising a bell-crank lever 102 one arm of which is arranged to be displaced by sidewise movement of a foot resting on treadle 58. Lever 102 is pivotally mounted on a pivot pin 103 and is connected to the latch by a rod 104.

The treadle and the bell-crank lever are both mounted on a base plate 105 the latter having ears 106 which afford bearings for trunnions 107 formed on the treadle. The trunnions are maintained in their bearings by pins 108 formed or carried by the treadle in such position that the trunnions may be readily detached from the ears when the treadle is tipped to an upright position.

In using the described machine to set fasteners such as those shown by Figure 6 the operative will first place two washers 17 on the lower setting tools 10, 10 and will then place a piece of work on the spear-points 46. Treadle 58 will then be depressed to clutch the shaft 25 to the source of rotation. As the setting plunger 22 descends the upper tools 20 engage the work and force it downwardly upon the spear-points to the position shown by Fig. 3. No gromets will be set at this time because the raceway remains latched in its retracted position. The treadle may be released immediately after being depressed, so that the clutch will be disconnected automatically when it has completed a single rotation. The material of the layers 78 is thus spread by the spear-points to form holes for the reception of the gromets without subjecting the latter to any stress that might crumple them. The foot that is used to depress the treadle 58 may now be swung to the right by a pivot motion on the heel, thereby displacing lever 102 so as to release arms 91, 93. These arms, together with the raceway structure, respond to the stress of compression spring 84, and the delivery ends of the raceways are thereby shifted to fastener-presenting position relatively to the spindles 40. Treadle 58 may now be depressed a second time to cause the inserting mechanism to execute another cycle of motions. Spindles 40 are thereby inserted through the gromets in the delivery ends of the raceways and the delivery ends are immediately retracted from the paths of the upper setting tools by cam 89 which, as previously stated, retracts arms 91, 93 far enough to place the raceways under control of the restraining device. Spring 101 of the restraining device acts automatically to re-establish the control of said device as soon as the latch has been retracted far enough to drop over the edge of the abutment 96. As the setting plunger continues to descend to the position shown by Figure 4 the gromets, which preferably fit closely on the spear-points, are pushed downwardly through the layers 78, and their lower ends are ultimately clenched by the lower setting tools. The treadle 58 will be released immediately after being depressed the second time so that the clutch will be disconnected automatically at the completion of its second cycle of rotation. The setting plunger comes to rest in its upper position, leaving sufficient space for the work to be lifted manually from the spear-points. From the foregoing description it will be seen that a complete cycle of operations includes a preliminary cycle of motions of the punching-and-inserting mechanism, then an independent operation of the fastener-supplying mechanism to present fasteners in potential inserting position, and then a second cycle of motions of the punching-and-inserting mechanism.

The modification shown by Figure 9 is adapted for use in attaching metallic clips, plates, or other devices, as, for example, those shown by Figure 10. According to this sample of work the two layers 78 of canvas or other sheet-material are between confronting metallic plates 110 arranged in pairs, each plate being provided with gromet-receiving holes before it is assembled with the sheet-material. In this example the gromets 79 are all alike but they may be supplied from the two hoppers 60, 61, or they could be supplied from a common hopper having three outlets in combination with a triple raceway.

The method of operating the machine for doing work as shown by Figures 9 and 10 would be as follows: The lower plate 110 would first be placed on the lower setting tools so as to have the spear-points project through the gromet-receiving holes. Then the belt or other piece of work would be placed on the spear-points, and the treadle 58 would be depressed to cause the upper tools to force the work down on the spear-points. After the preliminary cycle of the punching-and-inserting mechanism the second plate 110 would be placed on the spear-points, and the raceway would be tripped by displacing the lever 102. Then the treadle 58 would be depressed again, thereby causing the inserting mechanism to transfer gromets from the raceways to the work. Since the gromets fit closely on the spear-points, and since the plates 110 are free to shift edgewise relatively to the spear-points because their holes are larger than the latter, the barrels of the gromets will find the passageways through the plates as they are forced toward the lower tools. The lower ends of the gromet-barrels will be ultimately clenched against the lower plate by the lower tools 10.

Having thus described my invention, what I claim as new and desire to secure by Letters Patent of the United States is:

1. A fastener-inserting machine comprising mechanism for punching the work and inserting a fastener therein, mechanism for presenting fasteners successively to potential inserting position relatively to the first said mechanism, and trip-mechanism adapted to operate automatically after every operation of said presenting mechanism to prevent the latter from repeating.

2. A fastener-inserting machine comprising a pair of fastener-setting tools constructed and arranged to punch a hole in the work, mechanism for operating said tools, independently operable mechanism for presenting fasteners to said tools, and automatic mechanism for preventing repetition of operation of said presenting mechanism, said preventing mechanism being controllable manually to enable the fastener-presenting mechanism to operate.

3. A fastener-setting machine comprising mechanism adapted to punch a hole in the work in one cycle and set a fastener in said hole in a succeeding cycle, said mechanism including a punch arranged to remain in the work from the time when the hole is punched until the fastener is inserted therein, and means controllable independently of said mechanism for suppling fasteners thereto.

4. A fastener-inserting machine comprising cooperative setting tools, a movable raceway for presenting fasteners to one of the tools, two relatively timed mechanisms of which one is arranged to effect co-action of the setting tools and the other to retract the raceway, and manually controllable means arranged to move said raceway to fastener-presenting position at the will of the operative.

5. A fastener-setting machine comprising two mechanisms constructed and arranged to cooperate with each other and to operate independently of each other at will, one to punch a hole in the work and insert a fastener therein by successive cycles of motion, and the other to present the fastener between such cycles in position to be inserted, the first-defined of said mechanisms including a stationary punch to hold the work from the time when the hole is punched until the fastener is inserted therein.

6. A fastener-inserting machine comprising automatic means for inserting a fastener, said means including fastener-setting tools constructed and arranged to cooperate first to impale the work, and subsequently to insert a fastener therein while maintaining the work impaled, and manually controllable means for supplying fasteners to said inserting means but constructed and arranged not to function excepting when manually controlled to do so.

7. A fastener-inserting machine comprising fastener-inserting mechanism, means arranged normally to present a fastener to said mechanism, driven means arranged to retract said presenting means, and controlling means operable automatically to restrain the latter in retracted position, said restraining means being manually movable to release the presenting means.

8. A fastener-inserting machine comprising automatic fastener-setting mechanism and automatic fastener-supplying mechanism arranged to operate conjointly and also independently of each other, independent controllers associated with said mechanisms respectively to bring the latter into action individually at will, and means operable automatically to render one of said mechanisms inoperative in consequence of bringing them into action according to a predetermined order.

9. A fastener-inserting machine comprising automatic fastener-setting mechanism including a disconnectible clutch, automatic fastener-supplying means arranged normally to deliver a fastener to said setting mechanism, means arranged normally to restrain the fastener-supplying means from delivering a fastener, means controllable independently of the fastener-setting mechanism for releasing the fastener-supplying means from said restraining means, and means operable by said clutch for restoring the fastener-supplying means to the control of said restraining means.

10. A fastener-inserting machine comprising automatic fastener-inserting mechanism, a movable raceway for presenting fasteners to the latter, means controllable and operable independently of said mechanism for moving the raceway to fastener-presenting position, means controllably related to said mechanism for retracting the raceway, and controlling means arranged to operate automatically so as to lock the raceway in a position to which it is retracted by said retracting means.

11. A fastener-inserting machine comprising fastener-inserting mechanism, and manually controlled fastener-supplying mechanism including a raceway arranged to cooperate with said fastener-inserting mechanism when caused manually to do so, said manually controlled means normally preventing such cooperation of the raceway.

12. A fastener-inserting machine comprising fastener-setting mechanism, a spring-stressed raceway operable to deliver a fastener to the setting mechanism while the latter in inactive, independently controllable means for restraining the raceway from operating as aforesaid, and means controllably related to the setting mechanism for restoring the raceway from an operating condition to the control of said restraining means.

13. A fastener-inserting machine comprising fastener-setting mechanism including setting tools formed and arranged to punch a hole in the work, fastener-supplying mechanism controllable independently of said setting mechanism but operable conjointly therewith to supply the fasteners, and means controllably related to said setting mechanism to arrest said fastener-supplying mechanism automatically until it is brought into play otherwise than by said setting mechanism.

14. A fastener-inserting machine comprising fastener-setting mechanism, a raceway and yielding means arranged normally to move the delivery end thereof to delivering position relatively to the setting means, means operably related to the setting mechanism for retracting the delivery end from said position, and automatic means arranged normally to restrain the raceway from moving to delivering position, said restraining means being independent of the setting mechanism.

15. A fastener-inserting machine comprising automatic fastener-setting mechanism including a disconnectible clutch, a treadle connected to said clutch for controlling the same, fastener-supplying mechanism operable independently of the setting mechanism for delivering a fastener to the latter, and means for controlling the fastener-supplying mechanism independently of said clutch, said controlling means being arranged to be operated by a foot resting on said treadle.

16. A fastener-inserting machine comprising automatic fastener-setting mechanism, fastener-supplying mechanism operable independently of the setting mechanism for delivering a fastener to the latter, and two manually operable controls connected to said mechanisms respectively so as to bring each of the latter into action independently of the other, said controls being so arranged that a foot resting on one may operate the other.

17. A machine of the character described comprising fastener-inserting mechanism including a disconnectible clutch, controlling means therefor including a manually operable actuator, independently controllable mechanism arranged to supply fasteners to the first said mechanism, and means including a second manually-operable actuator for controlling said fastener-supplying mechanism, said two actuators being so arranged that either one of them may be operated by a human limb in operative relation to the other.

18. A fastener-inserting machine comprising cooperative setting tools of which one has a central projection for piercing the work, means for supplying fasteners to the mate of said piercing tool, mechanism operable while the fastener-supplying means is inactive to reciprocate one of said tools toward and from the other so as to force the piercing tool through the work, and means arranged to cause the fastener-supplying means thereafter to function conjointly with the mate of the piercing tool.

19. A fastener-inserting machine comprising fastener-setting mechanism including setting tools one of which is fixed and provided with a projection to punch the work, mechanism for supplying fasteners to the setting mechanism, the latter being operable while the fastener-supplying mechanism is inactive to impale the work on the fixed tool without inserting a fastener therein, and means operable at will to cause the two mechanisms thereafter to function conjointly to insert a fastener in the work so impaled.

20. A fastener-inserting machine comprising fastener-setting mechanism including setting tools one of which is fixed and provided with a projection to punch the work, mechanism for supplying fasteners to the other setting tool, the setting mechanism being operable to execute a cycle of motions so as to impale the work on the fixed tool while the fastener-supplying mechanism is inactive, and means for causing the two mechanisms thereafter to function conjointly so as to insert a fastener in the work so impaled.

21. A fastener-inserting machine comprising mechanism for punching the work and inserting a fastener, and mechanism for supplying fasteners thereto, said two mechanisms being controllable to cause the former to punch the work during a preliminary cycle and to maintain control of the punched work and insert a fastener into the punched hole during a subsequent cycle.

22. A machine of the character described comprising a fixed punch and a movable tool constructed and arranged to punch the work and insert a fastener therein, automatic mechanism for operating the movable tool, and means operable by said automatic mechanism but controllable at will so as to present a fastener to one of said tools after the movable tool has executed a cycle of motions to impale the work on the fixed punch.

23. A machine of the character described comprising a fixed punch and a movable die constructed and arranged to punch the work and insert a fastener therein, mechanism for operating said die, and fastener-supplying means controllable so as to remain inoperative during one cycle of motions of said die and to present a fastener to the latter for insertion during a subsequent cycle.

24. A fastener-inserting machine comprising work-punching mechanism including a fastener-inserting tool, and fastener-supplying mechanism arranged to function conjointly with said tool, said punching mechanism being operable independently of the fastener-supplying mechanism to punch a hole and being operable conjointly with the fastener-supplying mechanism to transfer a fastener from the latter to the punched hole.

25. A machine of the character described comprising fastener-inserting mechanism including a clutch capable of being connected and disconnected at will, a raceway for supplying fasteners to said mechanism, mechanism operable by said clutch for reciprocating said raceway, and controlling means arranged to operate automatically so as to prevent the raceway from repeating its function between two successive starts of said clutch.

26. A fastener-inserting machine comprising fastener-setting mechanism including a plurality of pairs of setting tools, and fastener-supplying mechanism including a plurality of hoppers and raceways for conducting fasteners from the hoppers to the setting mechanism, one of said raceways being mortised into two other raceways between their ends, said two other raceways being constructed and arranged to form, conjointly, a continuation of the raceway that is mortised into them.

27. A fastener-inserting machine comprising fastener-setting mechanism including a plurality of pairs of setting tools, and fastener-supplying mechanism including raceways for conducting fasteners to the setting tools, two of said raceways being constructed and arranged to form, conjointly, a third raceway, means for supplying fasteners to said two raceways, and separate means for supplying fasteners to said third raceway.

28. A fastener-inserting machine comprising fastener-setting mechanism including a plurality of pairs of setting tools, and fastener-supplying mechanism including raceways for conducting fasteners to the setting tools, two of said raceways being constructed and arranged to form, between them, a third raceway, means arranged to supply fasteners to said two raceways, and other means arranged to supply fasteners to said third raceway.

29. A fastener-inserting machine comprising fastener-setting mechanism including a plurality of pairs of setting tools, and fastener-supplying mechanism including raceways for conducting fasteners to the setting tools, a hopper for fasteners, two of said raceways being arranged to conduct fasteners from said hopper to the setting tools and being arranged to form, between them, a third raceway, and means other than said hopper for supplying fasteners to said third raceway.

30. A fastener-inserting machine comprising fastener-inserting mechanism including a plurality of pairs of setting tools, and fastener-supplying mechanism including a plurality of hoppers for fasteners, and raceways for conducting the fasteners from the hoppers to the setting tools, two of said raceways being constructed and arranged to form, between them, a third raceway, and means mortised into said two raceways between their ends to conduct fasteners from one of the hoppers to said third raceway.

31. A fastener-inserting machine comprising a plurality of fastener-inserting tools, and a plurality of hoppers and raceways for supplying fasteners to said tools respectively, said raceways comprising one or more members each common to a plurality of said tools for engaging and guiding fasteners supplied from a plurality of said hoppers.

32. A fastener-inserting machine comprising a plurality of fastener-inserting tools, a plurality of hoppers for supplying fasteners to said tools respectively, and a plurality of raceways including a fastener-engaging and guiding element common to two of said tools for maintaining separation of fasteners supplied from two of said hoppers.

33. A fastener-inserting machine comprising a plurality of fastener-inserting tools, a plurality of hoppers for supplying fasteners, and a plurality of slotted raceways including a slot-forming element common to two of said tools for guiding separate courses of fasteners supplied from two of said hoppers.

34. A fastener-inserting machine comprising a plurality of fastener-inserting tools, and a plurality of raceways for conducting fasteners from separate sources of supply toward said tools, said raceways being constructed and arranged to conduct along separate edges of one of the raceway-forming elements fasteners supplied from separate sources.

35. A fastener-inserting machine comprising a plurality of fastener-inserting tools, a plurality of hoppers for supplying fasteners, a raceway structure including a plurality of pairs of slot-forming strips leading from one of said hoppers to related inserting tools, one strip of one of said pairs and one strip of another one of said pairs being formed and arranged to form, between them, a separate and distinct raceway slot, and a raceway structure leading from another hopper to an intermediate part of the latter said slot and mortised into the strips forming the same.

In testimony whereof I have signed my name to this specification.

FRED A. RUMNEY.